United States Patent [19]

Taniyama

[11] Patent Number: 5,372,496
[45] Date of Patent: Dec. 13, 1994

[54] EJECTOR VALVE PLASTIC MOLDING APPARATUS

[76] Inventor: Yoshihiko Taniyama, 9380 Old Southwick Pass, Fulton County, Alpharetta, Ga. 30202

[21] Appl. No.: 19,219

[22] Filed: Feb. 18, 1993

[51] Int. Cl.⁵ .................. B29C 45/20; B29C 45/40
[52] U.S. Cl. ............................. 425/556; 425/564; 425/566; 425/436 R; 425/436 RM; 425/444; 425/DIG. 227; 249/67
[58] Field of Search .............. 249/67, 68; 425/556, 425/562, 564, 568, 444, 436 R, DIG. 227, 566, 436 RM

[56] References Cited

U.S. PATENT DOCUMENTS 4,378,963  4/1983  Schowenberg .............. 425/549
4,705,473 11/1987  Schmidt ...................... 425/562
4,715,806 12/1987  Ehrler et al. ................ 425/556
4,979,892 12/1990  Gellert ......................... 425/549

*Primary Examiner*—Khanh Nguyen
*Attorney, Agent, or Firm*—Troutman Sanders

[57] ABSTRACT

A molding apparatus for plastic objects which includes a valve which allows ejector pins to be positioned in close proximity to the valve needle. The valve includes a valve body and a flange surrounding at least a portion of the valve body such that the outer edges of the valve body and/or the flange may have slots which extend lengthwise from the top to the bottom of the valve. Depressed portions in the side portions of the flange and corresponding outer edges of the valve body may also extend through the length of the valve. The slots and depressed portions may be utilized for positioning ejector pins in close proximity to the valve needle.

17 Claims, 7 Drawing Sheets

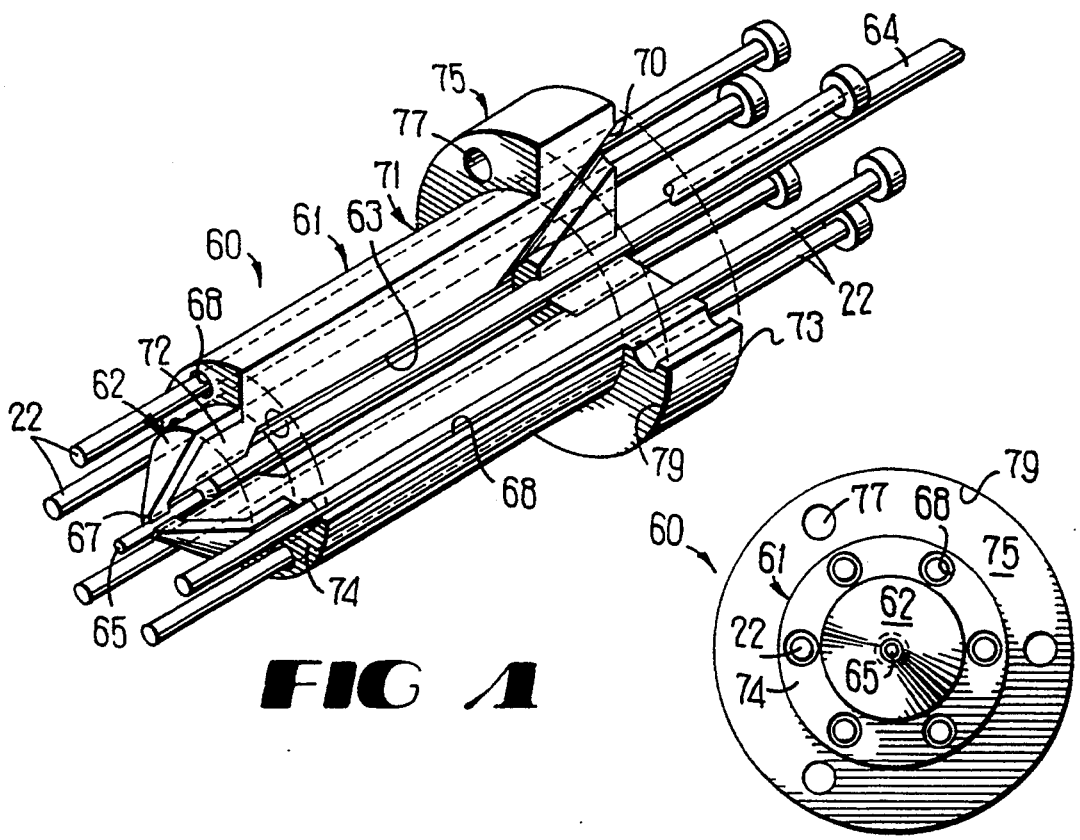
FIG 1
FIG 2
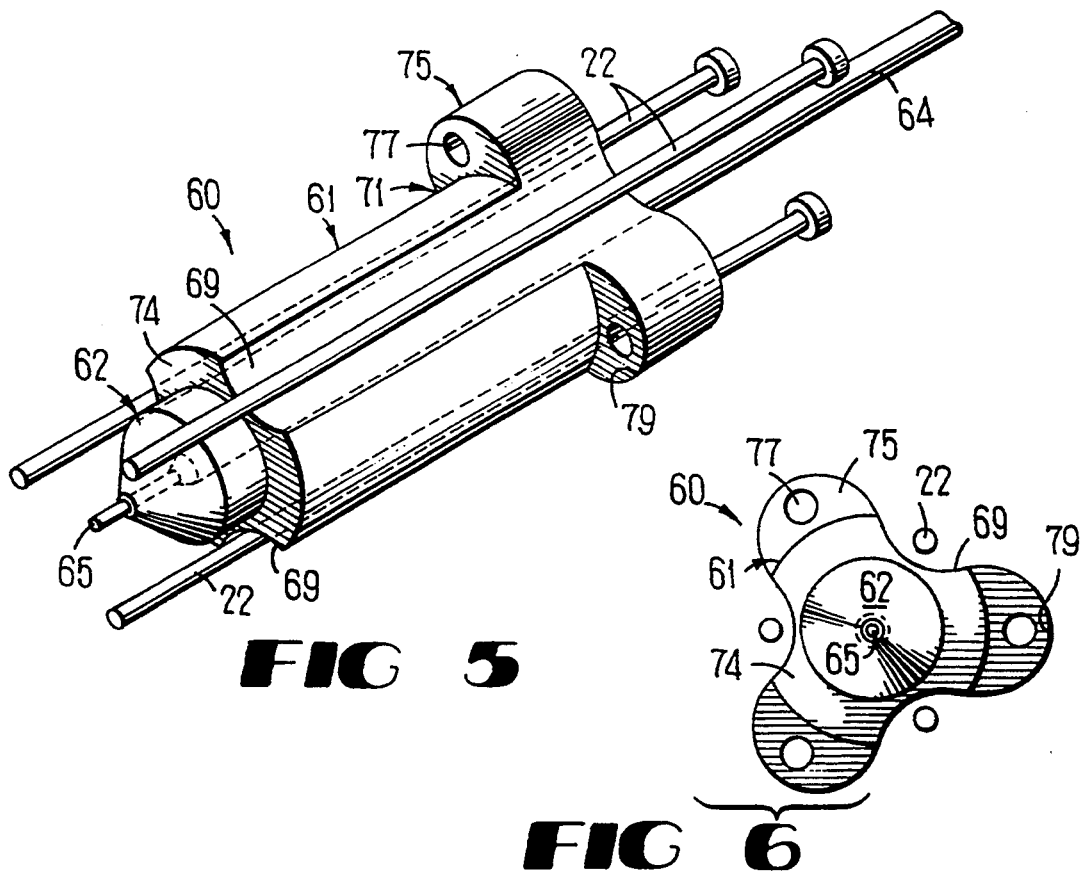
FIG 5
FIG 6

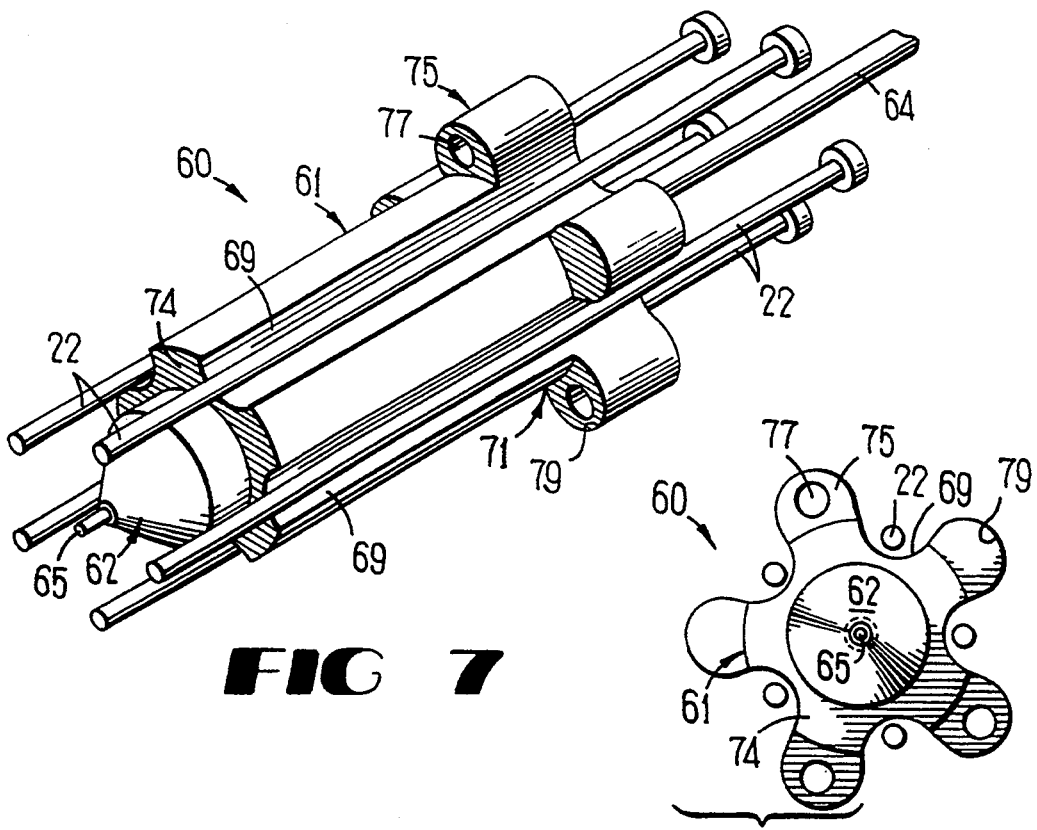
FIG 7
FIG 8
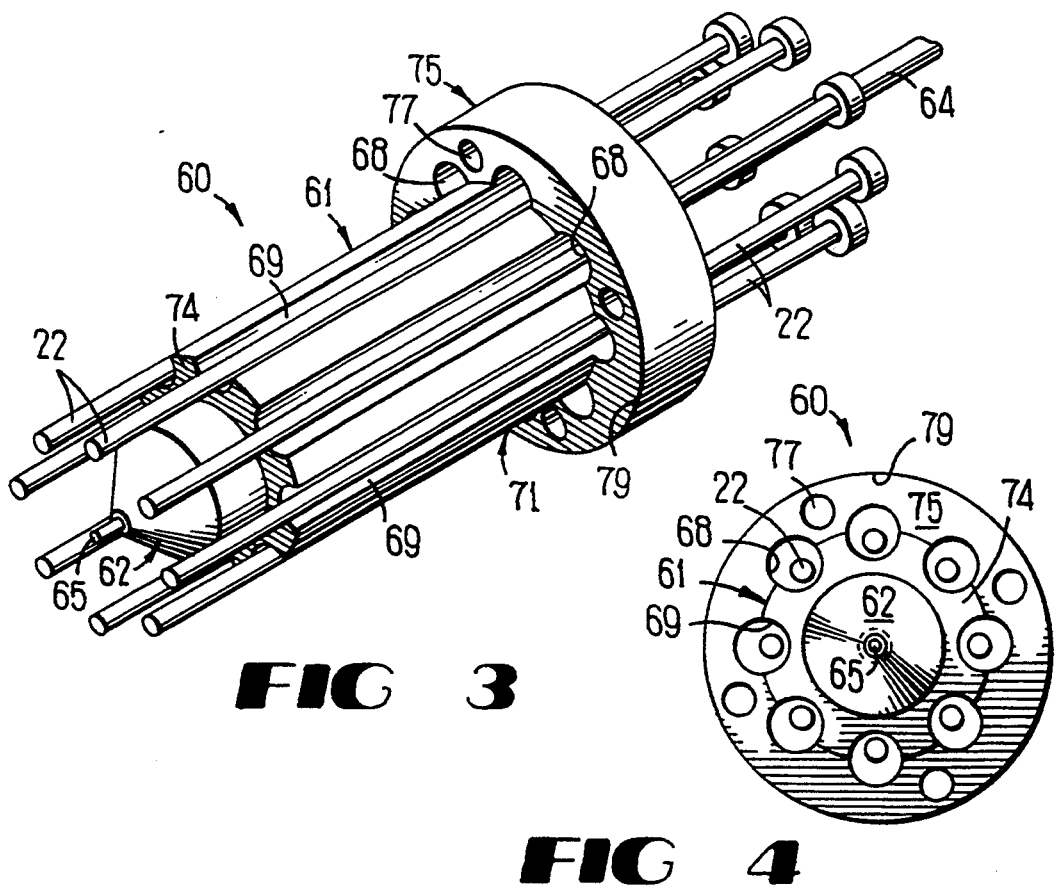
FIG 3
FIG 4

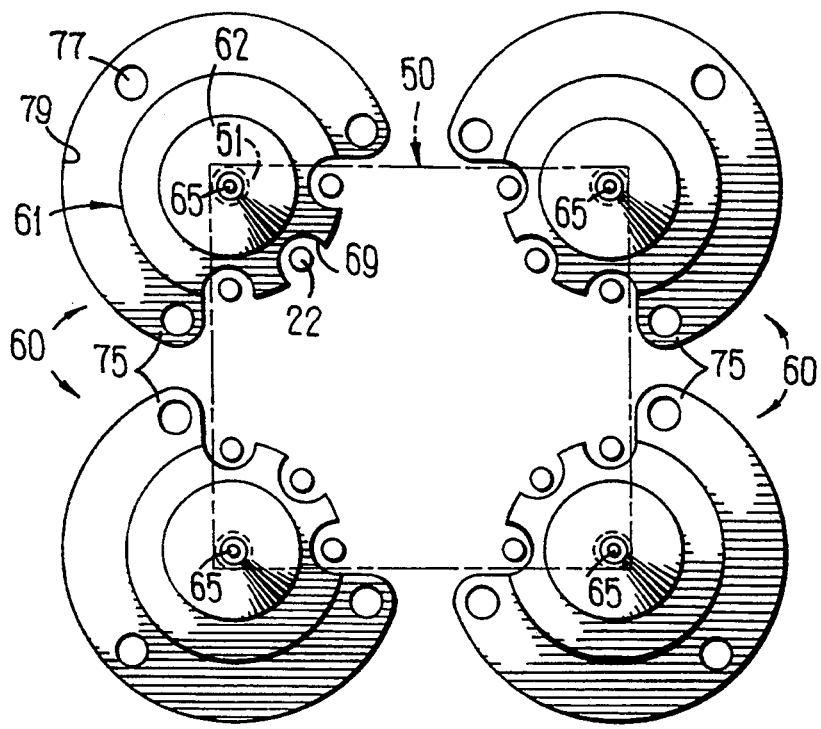
FIG 10
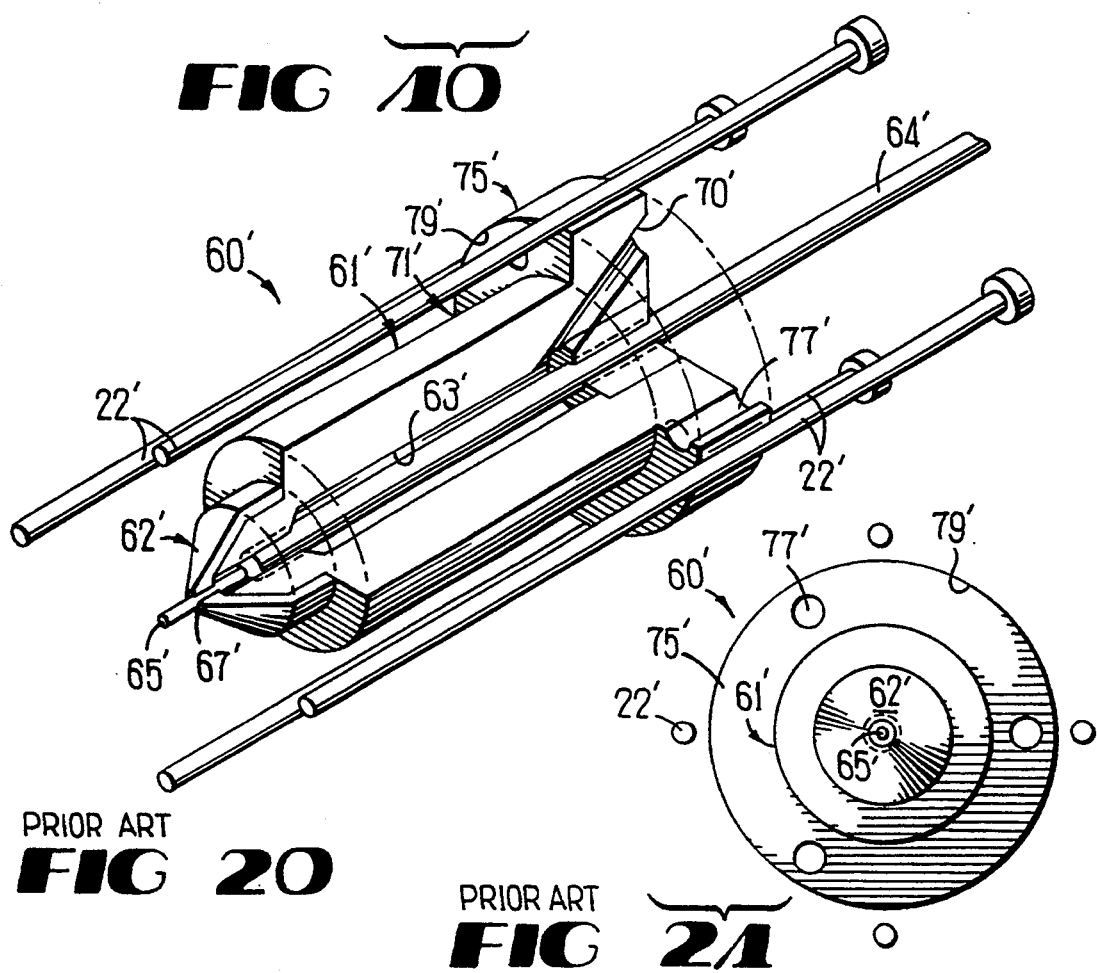
PRIOR ART
FIG 20
PRIOR ART
FIG 21

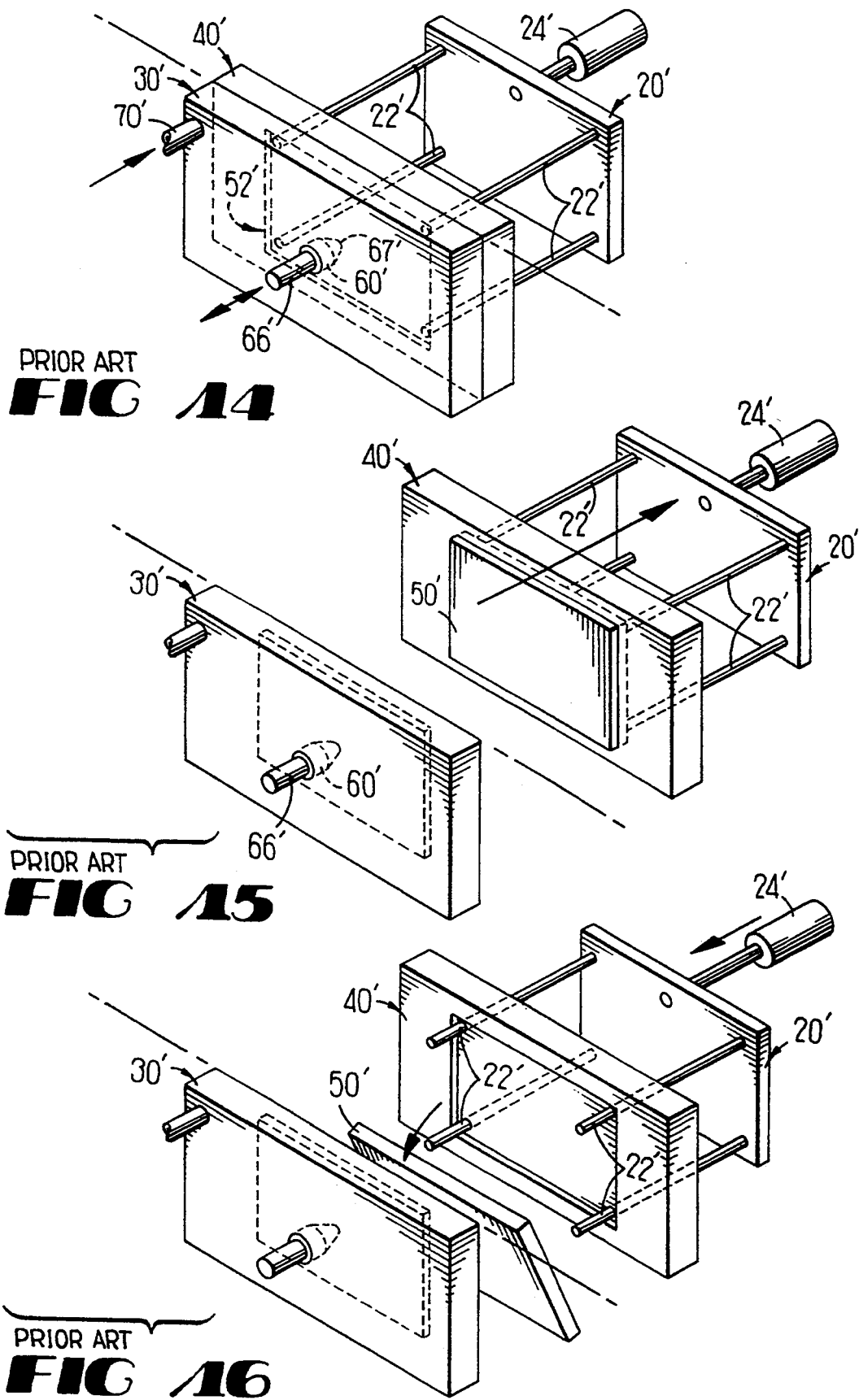

EJECTOR VALVE PLASTIC MOLDING APPARATUS

BACKGROUND OF THE INVENTION

1. Field of Invention

This invention relates to an apparatus for molding plastic objects which utilizes a needle in a valve of a liquid plastic injection unit as an ejector pin for ejecting the plastic object from the mold. More specifically, this invention relates to an apparatus in which the valve is modified such that additional ejector pins may be positioned in close proximity to the needle.

2. Description of the Prior Art

It is common to mold plastic objects (e.g. plastic containers and mini-disk cartridge shells) using an apparatus incorporating a number of metal plates. As shown in FIGS. 14-19, such an apparatus may include a core plate 30', a cavity plate 40' and an ejector plate 20'. Carved out areas in the interiors of the core plate and the cavity plate form the cavity of the mold when these are mated. Referring to FIGS. 14-16, the conventional molding devices position the ejector plate behind the cavity plate. A plurality of ejector pins 22' extend outwardly from the ejector plate and pass through holes in the cavity plate. Thus, when the ejector plate is moved forward the ejection pins are urged against any newly molded part in the cavity plate, thereby forcing the part out of the cavity plate. Therefore, when the ejector plate is moved forward, the ejector pins are urged against any newly molded part in the cavity plate, thereby forcing the part out of the cavity plate.

Typically, liquid plastic is injected from a supply line 70' coming from an injection unit into the mold through one or more openings in the core plate. The flow of liquid plastic material may be controlled by a valve 60' having a nozzle 62' and a needle 64' within the nozzle. The movement of the needle in to and out of the valve opening controls the flow of liquid plastic into the mold's cavity 52'. Movement of the needle may be controlled, for example, by a small hydraulic or air valve cylinder 66'. When the tip 65' of the needle is flush with the end 67' of the nozzle, the valve is closed (See FIG. 11). When the small cylinder retracts the needle, the valve is opened (See FIG. 12) and liquid plastic material is allowed to enter the cavity of the mold. After the cavity of the mold has been filled, the valve cylinder pushes the needle forward to the closed position (See FIG. 11), such that the tip of the needle is again flush with the end of the nozzle.

As shown in FIG. 14, the cavity plate 40' and core plate 30' form the cavity of the mold, as the liquid plastic is dispersed into it through the valve 60'. Referring to FIG. 15 after the plastic material has partially cooled, the cavity plate and the ejector plate both move in tandem away from the core plate, which remains stationary. This causes the molded plastic object 50' to be removed from the core plate. Finally, as shown in FIG. 16, a large hydraulic or air cylinder 24' pushes the ejector plate forward such that all of the ejector pins 22' simultaneously dislodge the molded plastic object from the cavity plate. This sequence of events may be repeated for the next plastic object. Unfortunately, the movement of the ejector pins against the partially cooled plastic part usually results in a blemish being produced at the point of contact. This blemish is on the opposite side of the object, which has received a blemish produced by the injector nozzle.

Most plastic parts have an appearance side, usually the front side, in which a label or some other form of identification is placed. In most present molding processes, as described above, blemishes are left on this appearance side by either the valve or the ejector pins. Manufacturers of these parts have, therefore, typically placed paper labels over the appearance side surface as a means of identifying the object and as a means of covering the blemishes. Due to the increased use of silk screening on plastic objects, a method of molding has recently been developed that allows a plastic object to have an appearance side surface which remains unblemished during the molding process such that, for example, a substantial portion of the appearance side surface may be silk screened.

As is shown in FIGS. 17-19, this innovative molding method positions the injection valve 60' and the ejector pins 22' on the same side of the plastic object 50' to be molded such that only the non-appearance side of the object has blemishes caused by the operation of the injector valve and ejector pins. This is made feasible by utilizing the needle 64' within the valve as an additional ejector pin. By using the needle as an ejector pin, proper positioning of the pins may be maintained to assure that the plastic object does not become warped as it is pushed out of the mold.

Though many configurations are possible, the molding device may include a core plate 30', a cavity plate 40', and an ejector plate 20'. Like the conventional plastic molding devices, the core plate and the cavity plate are mated together to form the mold's cavity. However, unlike conventional devices, the ejector plate is positioned on the side of the core plate opposite the cavity plate. In this embodiment, the core plate, not the cavity plate, has holes or apertures in its side wall which are evenly distributed and the carved out area side wall of the cavity plate should be smooth and/or have a clean finish. The ejector pins extending perpendicularly from the ejector plate's surface are positioned such that each is aligned with a corresponding hole in the core plate. The ends of the injector pins remain flush with the surface of the core plate until the ejector pins are activated to eject the plastic part.

As shown in FIGS. 11-13, an injection unit (not shown) which injects the mold material into the cavity of the mold is connected to the core plate with a flange 75'. The liquid plastic is dispersed through the injection unit via a valve 60', which is encompassed within the flange, having a nozzle 62' on its end. A needle 64' extends through the valve and into the nozzle such that it may serve two purposes. First, referring to FIGS. 11 and 12, the needle performs its conventional function by being utilized to control the flow of liquid plastic material into the cavity of the mold. Second, as shown in FIG. 13, the needle is also employed as an ejector pin by being coupled to the ejection plate so that it may be pushed past the flush point of the end 67' of the nozzle during the process of ejecting the finished plastic part.

As shown in FIG. 18, when the plastic material has partially cooled, the cavity plate moves away from the stationary core plate to remove the finished plastic part from the cavity plate. Next, referring to FIG. 19, the ejector plate is pushed forward so that both the needle and the ejector pins move into the holes in the core plate's side walls simultaneously, thereby dislodging the plastic part from the core plate.

Since the valve nozzle and ejector pins are positioned on the core plate side of the plastic part, which may be referred to as the "non-appearance side" or "back side," the other side of the plastic part, the "appearance side" or "front side", is molded without any marks. Therefore, the entire surface of the appearance side may be silk screened or used for other purposes requiring a smooth surface.

Though this innovative molding method has been found to perform considerably well as providing a means of molding a plastic object with one side remaining; unblemished, a problem sometimes exists. As shown in FIGS. 20 and 21, the ejector pins are positioned around the valve which includes the valve body and the flange. Due to the valve body and flange often occupying a substantial amount of space parallel to the object's surface, the positioning of the ejector pins and the number of pins which may be utilized is limited. Since the number of ejector pins used and their proper spacing relative to the plastic object's surface is imperative to ensure the prevention of warpage to the object, these limitations may result in a corrupted finished product.

SUMMARY OF THE INVENTION

It has previously been established that a need exists for a molding device for plastic objects which will leave the appearance side surface of the plastic object unmarked during and after the molding process, while at the same time will avoid warpage of the object during removal of it from the mold. These and other objectives are achieved by the molding apparatus of the present invention by positioning the injection valve and the ejector pins on one side of the mold so that only the non-appearance side of the object produced by the mold has blemishes caused by the operation of the injector valve and ejector pins, while at the same time providing a novel valve body and flange that allow multiple ejector pins to be positioned in areas relative to the object's surface that had previously been inaccessible due to the presence of the valve body and flange.

These objectives are accomplished by modifying the valve body and/or flange of the valve. The valve body and/or flange may be altered to include holes or slots that extend through the length of the valve body and/or flange such that additional ejector pins may be inserted in close proximity to the valve needle. Also, by modifying the shape of the flange and valve body with depressed portions which are formed in the side walls of the flange and the valve body and which extend lengthwise from the top of the valve to the bottom, additional ejector pins may be positioned much closer to the valve needle compared to those devices as discussed in the prior art.

For both modifications, the slots or depressed portions may be symmetrically positioned around the valve needle or located in any other configuration relative to the valve as needed to provide adequate access to the required pressure points on the surface of the plastic object. However, the distance between the slots and the inner edges of the depressed portions and the valve needle should be less than the distance between the outer edges of the flange and the valve needle.

The present invention not only makes it possible for many more push-out points on the surface of the object to be utilized, but it also creates the opportunity for many more valves to be employed for dispersing the liquid plastic. This feature is made possible by the fact that the immediate space surrounding the valve no longer needs to be reserved for ejector pins. Therefore, two or more valves may be positioned such that their outer edges, or more typically their flanges, are touching or in very close proximity to each other. Moreover, the corner portions on the surface of the plastic object, which are usually reserved for ejector pins and had previously typically been off limits to valves, may now be locations for valves since ejector pins within the valve may now be positioned in these corner areas with the use of this modified valve.

Though the most practical use for this invention would be for plastic molding devices for plastic objects with an unblemished appearance side, this apparatus is just as effective when utilized in conventional plastic molding devices as discussed in the prior art. Further, it may be employed for practically any sized plastic object.

BRIEF DESCRIPTION OF THE DRAWINGS

The accompanying drawings are preferred but nevertheless illustrative embodiments of the invention, which serve to aid in the explanation of the principles of the invention.

FIG. 1 is a cutaway perspective of the valve with the outer edge of the valve having six slots for ejector pins.

FIG. 2 is an end view of the valve with the outer edge having six slots for ejector pins.

FIG. 3 is a perspective view of the valve with the flange and the outer edge having slots for eight ejector pins.

FIG. 4 is an end view of the valve with the flange and the outer edge having slots for eight ejector pins.

FIG. 5 is a perspective view of the valve with the flange and the outer edge having depressed portions for three ejector pins.

FIG. 6 is an end view of the valve with the flange and the outer edge having depressed portions for three ejector pins.

FIG. 7 is a perspective view of the valve with the flange and the outer edge having depressed portions for five ejector pins.

FIG. 8 is an end view of the valve with the flange and the outer edge having depressed portions for five ejector pins.

FIG. 10 is an end view of four valves with the flanges and the outer edges of these valves having three depressed portions encompassing a ninety degree arc in relation to the center opening such that the depressions may be used for three ejector pins.

FIG. 14 is a perspective view of a prior art molding device for plastic objects with the core plate and the cavity plate mated together, with the valve mounted to the core plate, and with the ejector plate pins mated flush with the cavity plate side wall.

FIG. 15 is a perspective view of a prior art molding device for plastic objects with the ejector plates pins mated flush with the sidewall of the cavity plate after the cavity plate and ejector plate have moved in tandem away from the core plate keeping the plastic object lodged in the cavity plate.

FIG. 16 is a perspective view of a prior art molding device for plastic objects with the ejector pins of the ejector plate extending through the apertures in the side wall of the cavity plate to dislodge the plastic object.

FIG. 20 is a cutaway perspective view of a prior art molding device for plastic objects with four ejector pins positioned outside the valve.

FIG. 21 is a end view of a prior art molding device for plastic objects with four ejector pins positioned outside the valve.

DETAILED DESCRIPTION OF ILLUSTRATIVE EMBODIMENTS

Figure 9:
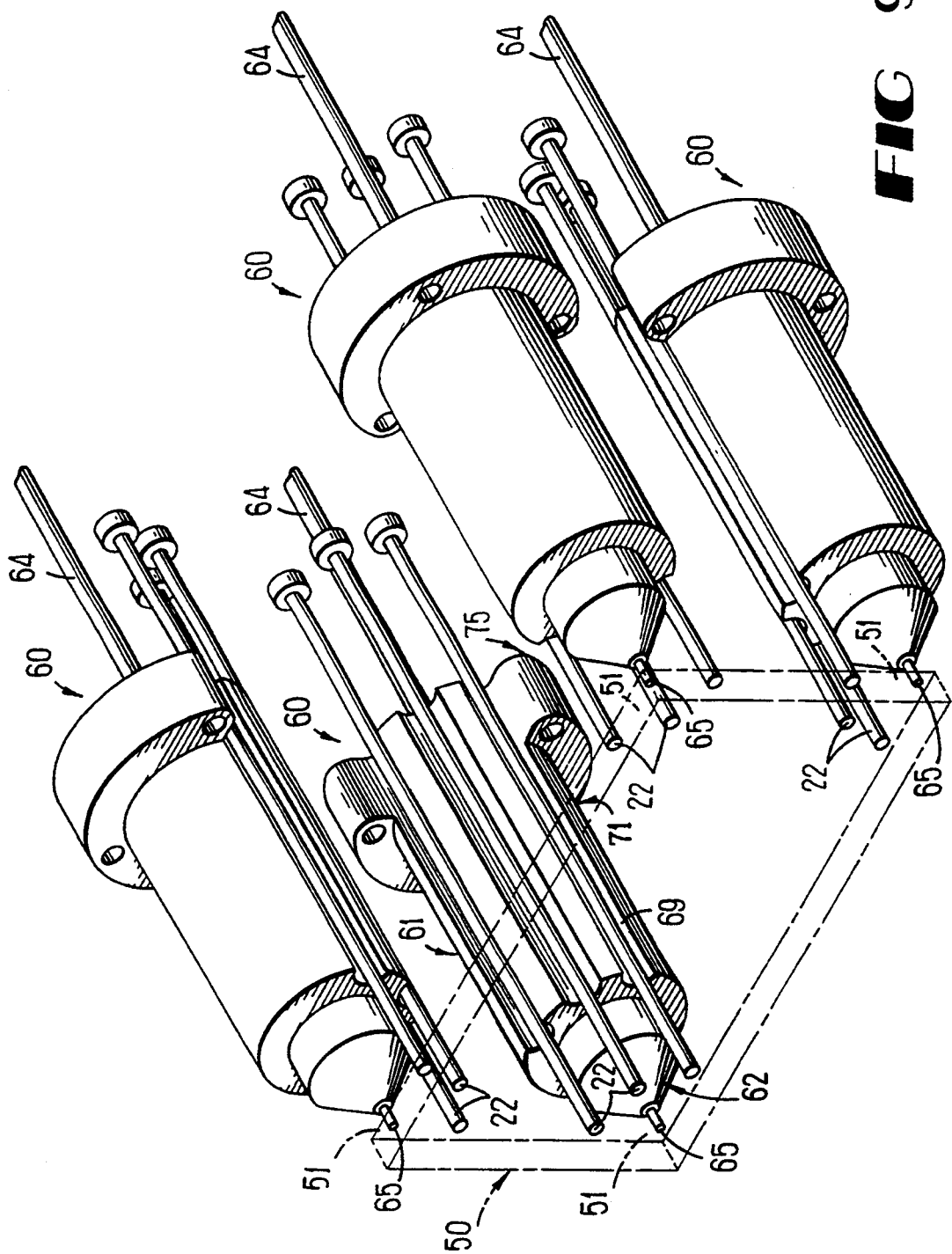
FIG. 9 is a perspective view of four valves with the flanges and the outer edges of these valves having three depressed portions encompassing a ninety degree arc in relation to the center opening such that the depressed portions may be used for three ejector pins.

Referring to FIGS. 1-10, several preferred but nevertheless illustrative embodiments of the molding apparatus of the present invention are shown. In particular, a valve 60 for controlling the flow of liquid plastic material into the cavity of the mold and the ejector pins 22 for ejecting the plastic object of the mold are illustrated.

For all of these embodiments, the valve assembly 71 includes a valve 60 and a flange 75. The valve 60 includes a valve body 61, a nozzle 62, a centralized opening 63, and a needle 64. The valve body 61 is preferably cylindrical, and has a top 72, a bottom 73, and a centralized opening 63 which extends within the valve body 61 along a longitudinal axis from the top 72 to the bottom 73. Attached to the top 72 of the valve body 61 is a nozzle 62. The portion of the nozzle 62 extending away from the valve body 61, is preferably conically shaped such that the end 67 of the nozzle 62 forms a reduced diameter tip. The centralized opening 63 in the valve body 61 extends up to and through the nozzle 62. Typically, the diameter of the nozzle 62 is less than the diameter of the valve body 61. Therefore, the bottom portion of the nozzle 62 that is coupled to the top 72 of the valve body 61 is surrounded by an outer edge 74 of the valve body 61. A needle 64 rests inside the centralized opening 63 of the valve body 61 and extends from the bottom 73 of the valve body 61 to the end 67 of the nozzle 62 where the tip 65 of the needle 64 is located. Attached to the centralized opening 63 at the bottom 73 of the valve body is a supply line 70 which extends from a liquid plastic injection unit (not shown).

The flange 75 surrounds at least a portion of the bottom 73 of the valve body 61, and is coupled to the valve body 61 such that the flange 75 may be used to mount the valve body 61 to the mold (not shown). Preferably, holes 77 in the flange 75 extending parallel to the valve body 61 may be used to mount the valve 60 to the mold, although other methods of mounting the valve 60 with the flange 75 may also be employed. Typically, the outermost edges 79 of the flange 75 defines the outermost edge of the valve assembly 71. Though the valve 60 is preferably mounted to the mold with a flange 75, other methods of attaching the valve 60 to the mold may be utilized (i.e., soldering and gluing).

Figure 11:
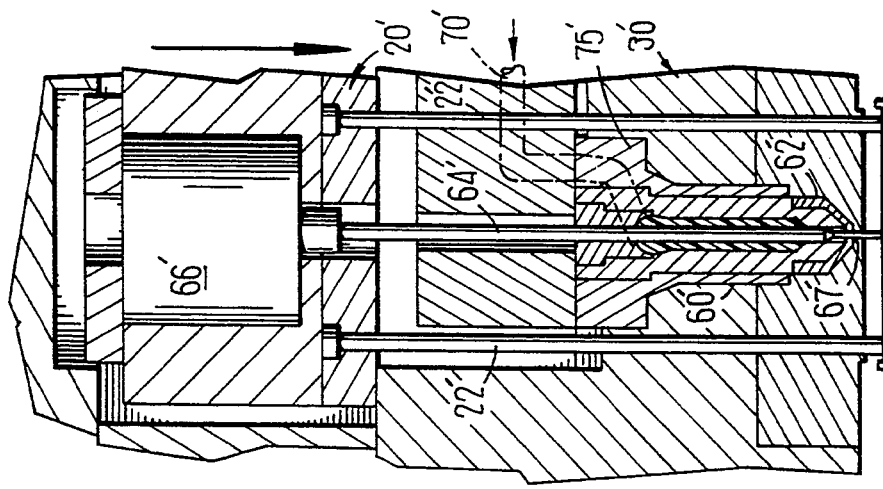
FIG. 11 is a cross-sectional view of a prior art valve in the closed position with the tip of the needle extending to the end of the nozzle.
Figure 12:
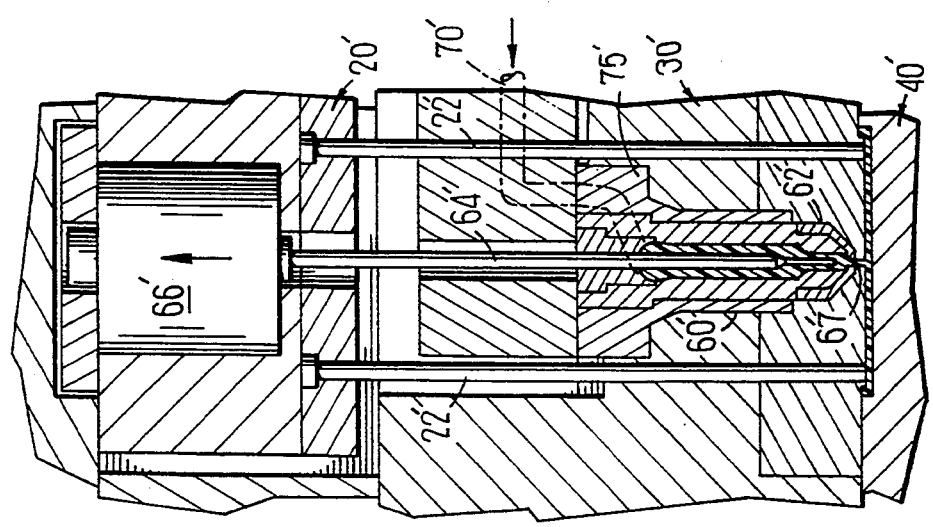
FIG. 12 is a cross sectional view of a prior art valve in the open position with the tip of the needle retracted within the valve away from the end of the nozzle.
Figure 13:
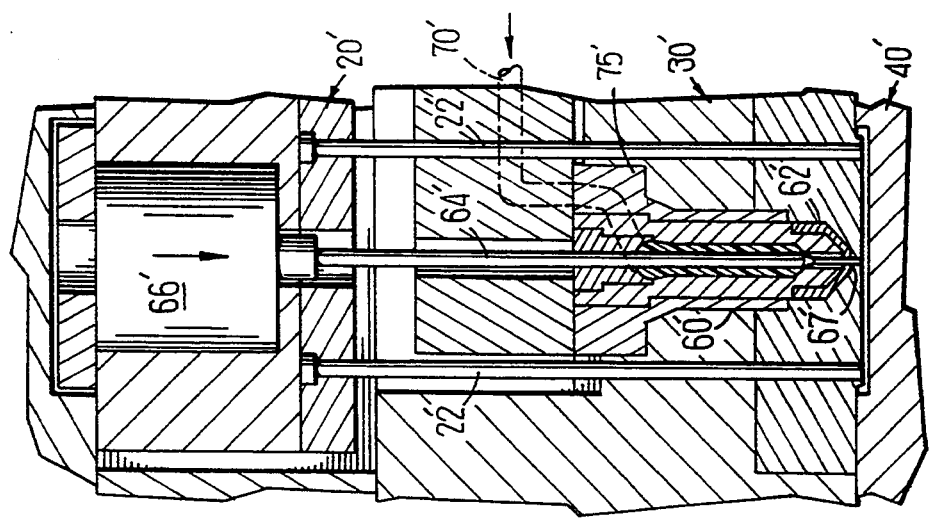
FIG. 13 is a cross sectional view of a prior art valve in the ejection position with the tip of the needle extending through the valve and past the end of the nozzle.
Figure 17:
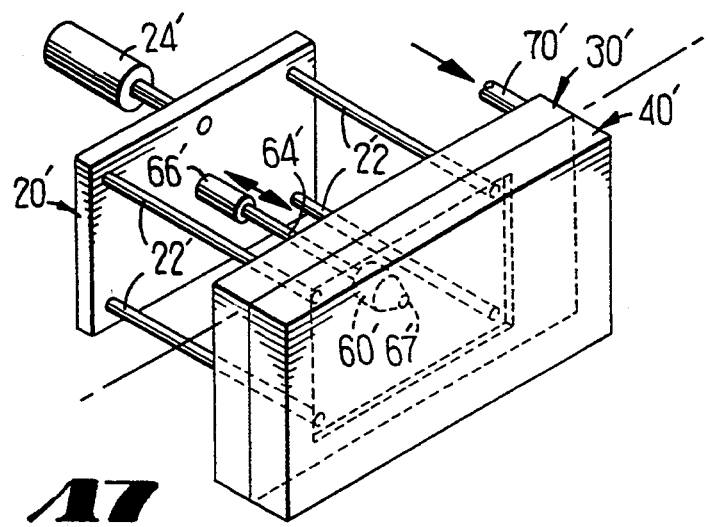
FIG. 17 is a perspective view of a prior art molding device for plastic objects with the core plate and the cavity plate mated together, with the valve mounted to the core plate, and with the ejector pins of the ejector plate mated flush with the side wall of the core plate.
Figure 18:
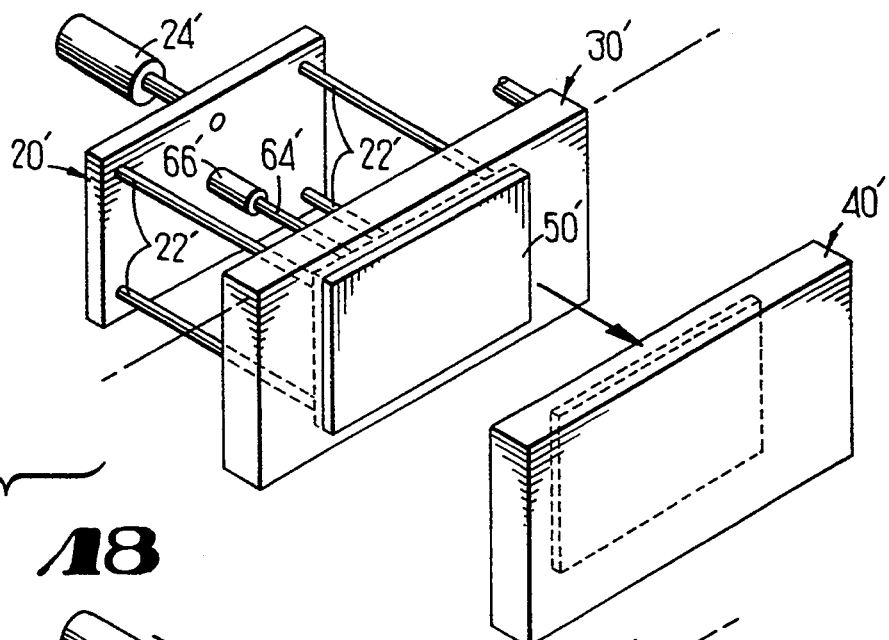
FIG. 18 is a perspective view of a prior art molding device for plastic objects with the ejector pins of the ejector plate mated flush with the side wall of the core plate after the cavity plate has moved away from the core plate leaving the plastic object lodged in the core plate.
Figure 19:
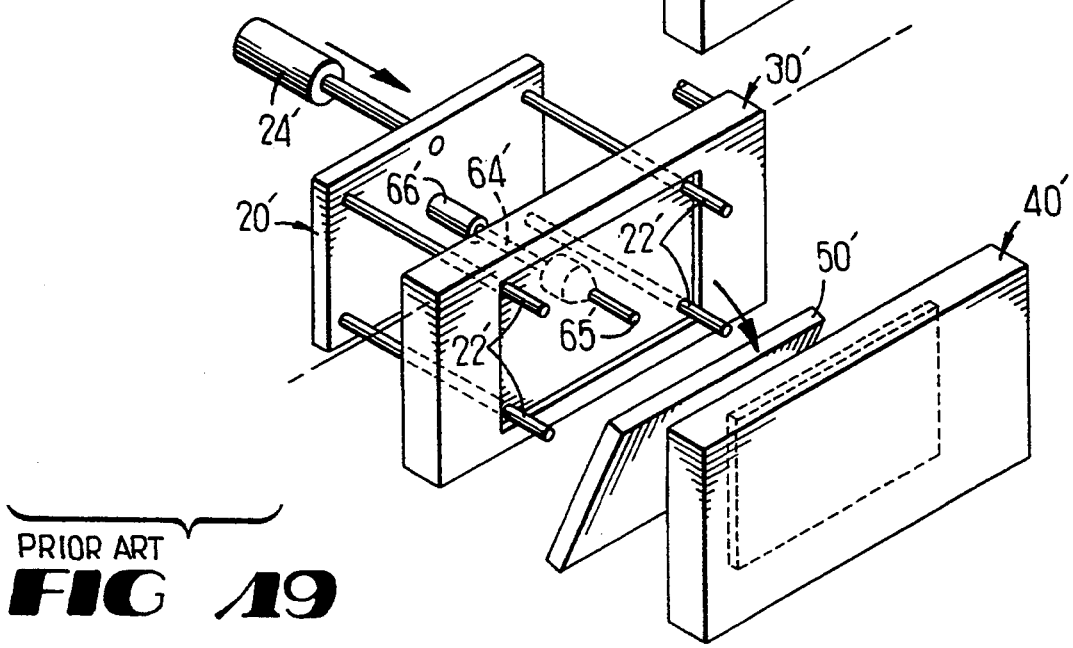
FIG. 19 is a perspective view of a prior art molding device for plastic objects with the ejector pins of the ejector plate extending through the apertures in the side wall of the plate to dislodge the plastic object.

After the valve assembly 60 has been mounted to the mold with the flange 75, the tip 65 of the needle 64, which is positioned at the end 67 of the nozzle 62, may be used to control the flow of the liquid plastic material. The needle 64 controls the flow of material which travels from the injection unit, through the centralized opening 63 in the valve body 61 and the nozzle 62, and out the end 67 of the nozzle 62 into the cavity of the mold. As shown in FIG. 11, when the tip 65' of the needle 64' is flush with the end 67' of the nozzle 62', the valve 60' is closed. Referring to FIG. 12, when the tip 65' of the needle 64' is retracted within the valve body 61' away from the end 67' of the nozzle 62', the valve is open and liquid plastic material may flow into the mold. As shown in FIG. 11, when the tip 65' of the needle 64' returns to the position flush with the end 67' of the nozzle 62', the valve 60' is again closed. Finally, referring back to FIGS. 1-10, after the plastic object formed within the mold has cooled to a preset temperature, the tip 65 of the needle 64 along with other ejector pins 22 are pushed forward such that they may be utilized to eject the semi-cooled plastic object (not shown) from the mold (not shown).

As shown in FIGS. 1 and 2, the valve assembly 71 may be formed to include one or more slots or holes 68 which extend lengthwise through the outer edge 74 of the valve body 61 from the top 72 to the bottom 73 of the valve body 61. Each slot 68 may be employed to house an ejector pin 22 such that each ejector pin 22 may be positioned much closer to the centralized opening 63 then in those devices discussed in the prior art. Referring to FIGS. 3 and 4, the diameter of one or more slots 68 may also be widened to extend lengthwise through the flange 75. Finally, as would be expected, the slots 68 may be formed in the valve assembly 71 such that they extend lengthwise only through the flange 75 (not shown).

For most molded objects, the slots 68 are preferably circular in cross-section and symmetrically positioned through the outer edge 74 around the centralized opening 63. However, the slots 68 may be almost any shape and may be positioned anywhere on the outer edge 74 of the valve body 61 to meet the needs of the plastic object and/or the molding device. Also, though six (FIGS. 1 and 2) and eight (FIGS. 3 and 4) slots 68 are shown in these illustrative embodiment, almost any number of slots 68 may be formed in the outer edge 74 and/or flange 75 depending on the size of the ejector pins 22 and the radius of the outer edge 74 and flange 75.

As shown in FIGS. 5-8, the valve assembly 71 may be formed with one or more depressed or cutout portion 69 extending lengthwise through the side wall portion of the flange 75. If the depressed or cutout portion 69 extends from the outer edge to the inner edge of the flange 75, then separate and distinct flange portions which are spaced apart may result. These depressed portions may also extend to and include corresponding side wall portions of the outer edge 74 of the valve body 61. Therefore, one or more ejector pins 22 may be located much closer to the centralized opening 63 than the ejector pins 22 of the prior art.

The depressed portions 69 are preferably rounded, although they may be straight or almost any other shape. Though the depressed portions 69 are preferably symmetrically positioned around the centralizing opening 63, they may be formed anywhere in the flange 75 and corresponding outer edge 74 of the valve body 61. Further, though three (FIGS. 5 and 6) and five (FIGS. 7 and 8) depressed portions 69 are shown as illustrative embodiments, almost any number of depressed portions may be formed depending on the dimensions of the valve 60, nozzle 62, flange 75, and ejector pins 22. Finally, the ejector pins 22 may be placed in the outer edge 74 region of the valve body 61, as shown in FIGS. 6 and 8, may be positioned in the flange 75 regions of the valve assembly 71, or in both regions as needed.

Referring to FIGS. 9 and 10, as discussed for the previous embodiments, the depressed portions 69 and/or the slots 68 (not shown) do not have to be symmetrically positioned around the centralized opening 63. As shown here, the depressed portions 69 may be formed to encompass a ninety degree arc around the centralized opening 63. Therefore, unlike the prior art, the valve 60 may be positioned in the corners 51 of the plastic object 50 because the pressure points at the corners 51 of the plastic object 50, which are usually the most important push-out points on the object 50, are now accessible to the ejector pins 22.

I claim:

1. In a plastic injection molding device including a nozzle valve assembly having a centralized opening for dispensing plastic material and an ejector pin adapted to eject molded objects from said molding device, the improvement comprising:

means for allowing placement of said ejector pin a first radial distance from said nozzle centralized opening of said valve assembly, wherein said first radial distance is less than a second radial distance from said centralized opening of said valve assembly to an outermost edge of said valve assembly.

2. The improvement of claim 1, wherein said placement allowing means includes a slot extending longitudinally through said nozzle valve assembly.

3. The improvement of claim 2, wherein said slot is circular.

4. The improvement of claim 1, wherein said placement allowing means includes a plurality of slots extending longitudinally through said nozzle valve assembly.

5. The improvement of claim 4, wherein said plurality of slots are symmetrically positioned around said centralized opening.

6. The improvement of claim 2, wherein said nozzle valve assembly includes a valve body, and wherein said slot extends longitudinally through said valve body.

7. The improvement of claim 2, wherein said nozzle valve assembly includes a valve body and a flange surrounding a portion of said valve body, and wherein said slot extends longitudinally through said flange.

8. The improvement of claim 2, wherein said nozzle valve assembly includes a valve body and a flange surrounding a portion of said valve body, and wherein said slot extends longitudinally through a portion of said flange and a corresponding portion of said valve body.

9. The improvement of claim 1, wherein said placement allowing means includes a depression in a side portion of said nozzle valve assembly extending longitudinally through said valve assembly.

10. The improvement of claim 9, wherein said depression is rounded.

11. The improvement of claim 8, wherein said placement allowing means includes a plurality of depressions in a side portion of said nozzle valve assembly extending longitudinally through said nozzle valve assembly.

12. The improvement of claim 11, wherein said depressions are symmetrically positioned around said centralized opening.

13. The improvement of claim 9, wherein said nozzle valve assembly includes a valve body and a flange surrounding a portion of said valve body, and wherein said depression is formed in a side portion of said flange extending longitudinally through the side portion of said flange.

14. The improvement of claim 13, further including a longitudinal depression in a side portion of said valve body longitudinally aligned with said depression formed in said side portion of said flange.

15. The improvement of claim 9, wherein said nozzle valve assembly includes a valve body, and wherein said depression is formed in a side portion of said valve body extending longitudinally through said side portion of said valve body.

16. The improvement of claim 1, wherein said nozzle valve assembly includes a valve body and a flange for mounting said valve assembly, wherein said flange surrounds said valve body, and wherein said outermost edge of said valve assembly is an outermost edge of said flange.

17. The improvement of claim 1, wherein said nozzle valve assembly includes a valve body surrounding said centralized opening of said valve assembly, and wherein said outermost edge of said valve assembly is an outermost edge of said valve body.

* * * * *